United States Patent
Brady et al.

(10) Patent No.: US 6,748,853 B1
(45) Date of Patent: Jun. 15, 2004

(54) FOOD PROCESSING MACHINE

(75) Inventors: Martin Brady, Richmond, VA (US); Jeffrey T. Mauch, Mechanicsville, VA (US); Brian J. O'Flynn, Richmond, VA (US); Brian P. Williams, Midlothian, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 10/130,089

(22) PCT Filed: Sep. 13, 2000

(86) PCT No.: PCT/US00/25041
§ 371 (c)(1),
(2), (4) Date: Sep. 23, 2002

(87) PCT Pub. No.: WO02/21986
PCT Pub. Date: Mar. 21, 2002

(51) Int. Cl.⁷ .............................. A23L 1/00; A23N 1/00; A47J 43/046; A47J 43/07; B02C 18/16
(52) U.S. Cl. .................... 99/492; 99/342; 99/348; 99/493; 99/510; 241/37.5; 241/92; 366/314; 366/601
(58) Field of Search .................. 99/337, 338, 342–344, 99/326–333, 485, 486, 492, 493, 348, 501–513; 241/37.5, 92, 36, 282.1, 282.2, 280, 101.01, 101.2; 366/144–146, 314, 601; 83/356.3, 355; 200/302.1–302.3; 361/195–203; 219/492, 494, 442, 486, 714; 340/870.17; 318/811, 772; 700/90

(56) References Cited

U.S. PATENT DOCUMENTS

| | | | | |
|---|---|---|---|---|
| 4,371,118 A | * | 2/1983 | Sontheimer et al. | 241/30 |
| 4,542,857 A | * | 9/1985 | Akasaka | 241/37.5 |
| 4,629,131 A | * | 12/1986 | Podell | 241/36 |
| 4,691,870 A | * | 9/1987 | Fukunaga et al. | 241/36 |
| 4,741,482 A | * | 5/1988 | Coggiola et al. | 241/37.5 |
| 4,799,626 A | * | 1/1989 | Hickel et al. | 241/37.5 |
| 4,921,174 A | * | 5/1990 | Okada et al. | 241/37.5 |
| 4,921,175 A | * | 5/1990 | Okada et al. | 241/37.5 |
| 5,244,275 A | * | 9/1993 | Bauer et al. | 366/314 |
| 5,347,205 A | * | 9/1994 | Piland | 318/811 |
| 5,425,237 A | * | 6/1995 | Suer | 60/414 |
| 5,454,299 A | * | 10/1995 | Gonneaud | 99/492 |
| 5,768,978 A | * | 6/1998 | Dorner et al. | 99/348 |

* cited by examiner

Primary Examiner—Timothy F. Simone
(74) Attorney, Agent, or Firm—Roger S. Dybvig

(57) ABSTRACT

A food processor has a main body (10) with a base member (12) extending laterally. A bowl (16) sits on the base member (12) and a one-piece drive shaft (18) extends up through the bowl. A hollow lid (32) fits on the bowl (16) and the upper part of the drive shaft (18) is positioned in the lid space. A chopping or S blade (26) fits on the lower part of the drive shaft (18) is positioned in the lid space. A chopping or S blade (26) fits on the lower part of the shaft. A slicer shredder disc (40) and a displacement disc (46), can be positioned at the upper part of the shaft. Access to a delivery chute (36) on the lid is provided by a removable gate (50). The only removable parts of the food processor are the S blade, the slicer/shredder disc, the displacement disc and the removable gate.

42 Claims, 9 Drawing Sheets

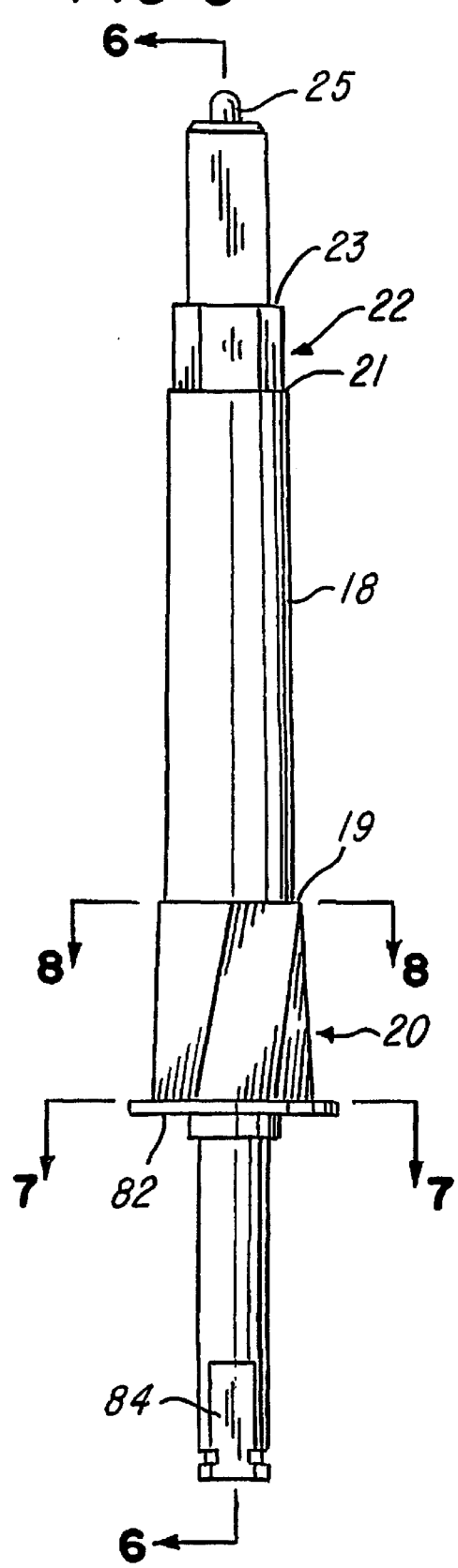
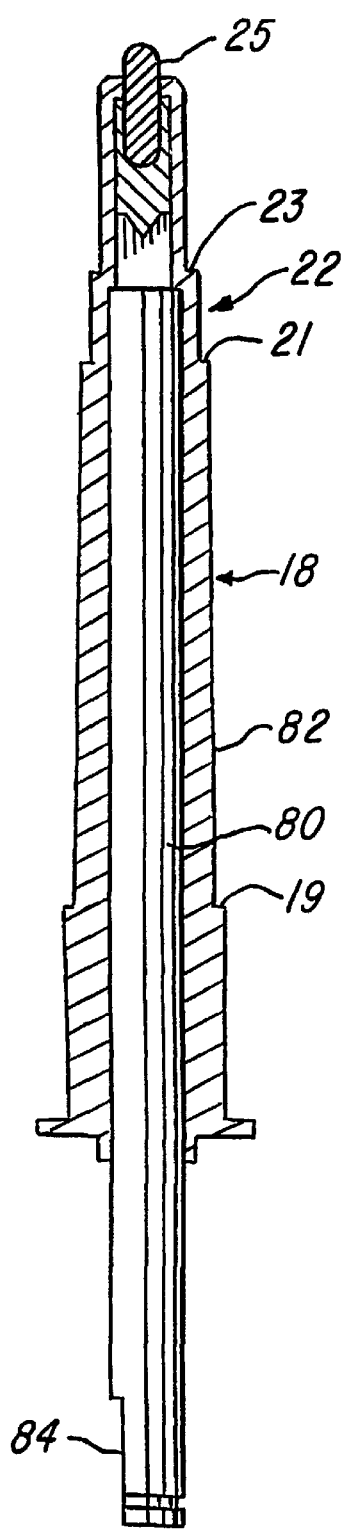

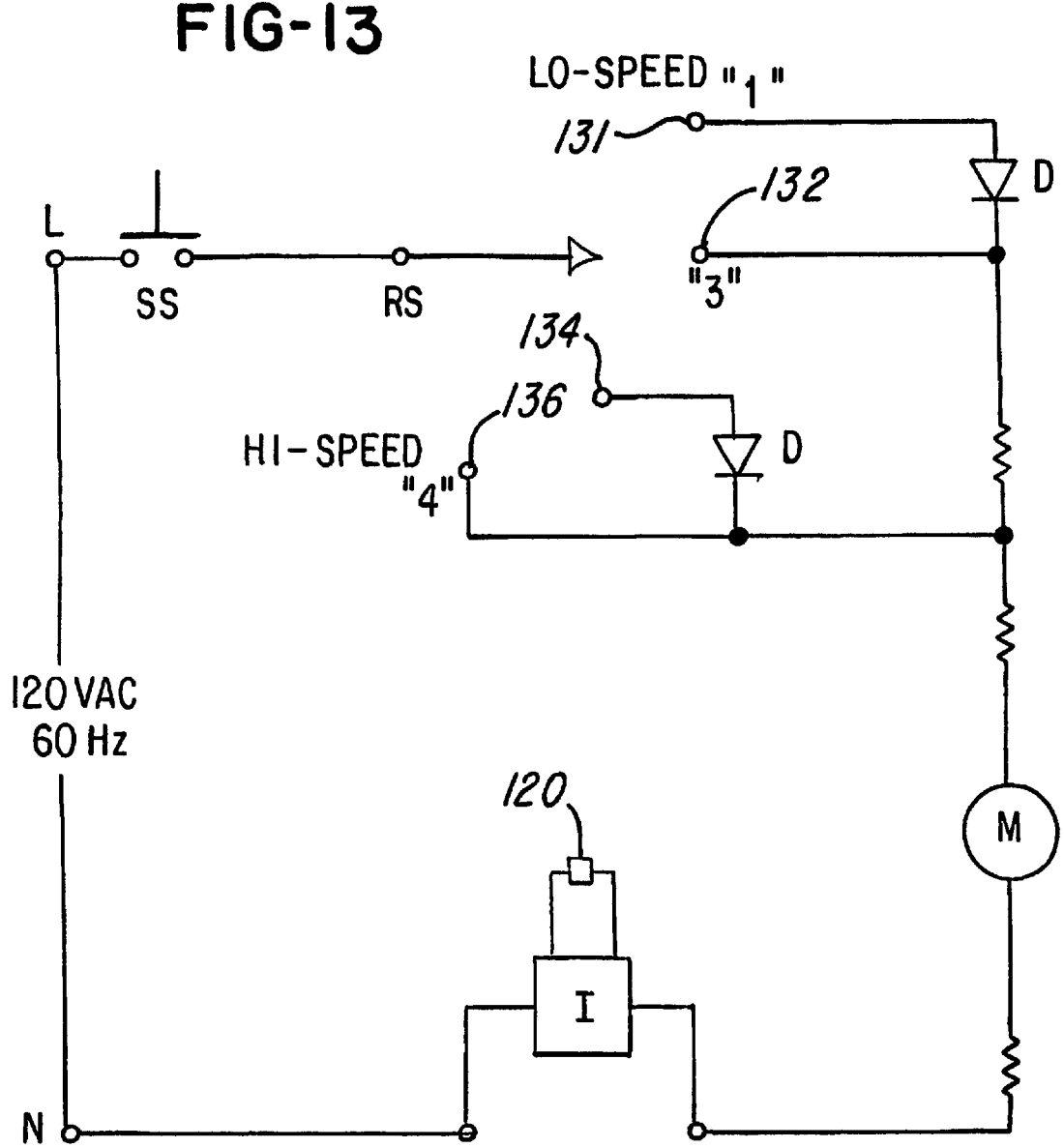

FOOD PROCESSING MACHINE

This invention relates to food processing machines, and in particular to relatively small machines for use domestically and otherwise.

BACKGROUND OF THE INVENTION

Food processors of the general type relating to the present invention, generally comprise a main body portion, having a motor, and a base portion extending laterally from the lower part of the main body. A drive shaft extends upwardly from the base portion and a bowl sits on the base portion having locking members which engage in the main body portion. Unless correctly installed, and locked, the motor cannot be energized. The shaft extends up through the bowl inside a tubular member of the bowl. A first rotating member, which may be a cutter, drops over the drive shaft and engages with it, for rotation by the motor. The cutter normally has an inner tubular member which fits over the drive shaft and inside the tubular member of the bowl. A further outer tubular member on the cutter fits outside the tubular member of the bowl. A cutter has blades at the lower end of the outer tubular member, in the proximity of the bottom of the bowl.

A lid fits on top of the bowl in locking engagement therewith, and the cover also has locking members which must be engaged correctly with the main body portion, before power can be supplied.

For slicing or shredding material a disc cutter can be mounted at the upper part of the apparatus. In some instances an extension shaft is positioned on the upper end of the drive shaft for reception and driving of the disc cutter.

The lid normally has a feed tube in the top. A delivery chute can be supplied whereby sliced or grated material can be ejected from the machine for collection. This is obtained by a further disc having ribs on its upper surface, which is positioned just below the disc cutter. Alternatively, leaving out the further disc, sliced or shredded material can fall into the bowl.

Various disadvantages occur with present food processors. Alignment of the bowl to the main body can be difficult. Alignment of any further bowl, and the lid can present further problems, and interlocking of the various members of the apparatus can therefore be difficult. On occasion, alignment can appear to be in order, with interlocking, but no power to the motor is obtained. There is no indication that interlocking is not present, other than lack of power.

There is normally only one rotational position of the bowl relative to the main body. This is usually adapted to be convenient for right handed uses -i.e. a handle on the bowl is positioned so that it is to the right side when the bowl is correctly positioned on the base.

If an extension shaft is used, and an auxiliary bowl, then more parts must be stored.

Various other disadvantages occur with present processors.

SUMMARY OF THE INVENTION

The present invention provides a food processor having various features which provide improvements over previous processors. In the present invention easy alignment of the bowl with the main body, is easily obtained and this can be obtained for two alternative rotational positions of the bowl. A single drive shaft is provided with cutter engaging formations at the lower part which prevent lifting of the cutter when in operation. Further formations at the upper end of the shaft engage with a disc cutter, for slicing or shredding, and a displacement disc can be mounted on the shaft a short distance below the disc cutter for ejection of sliced or shredded material out of a delivery shoot at the side of the machine.

The lid forms a hollow chamber at the top, in which the disc cutter, and displacement disc, are positioned. The lid has a normal feed tube for feeding of material into the machine, and may include a discharge chute for discharge of sliced or shredded material, when the displacement disc is in position. A further small orifice can be provided for adding material, such as oils etc., in controlled amounts.

To assist in ensuring that correct positioning of the various parts occur, with the necessary final interlocking with the main body, an indicator light can be provided, which will indicate that all parts are correctly positioned.

A retractable information tab or panel member may be incorporated into the processor. In one embodiment, this panel or tab swings in and out and carries operating instructions or other information. Since a typical processor includes a drive unit having a housing for the motor, and the housing normally includes a base member for mounting a bowl, the retractable or displaceable tab or panel member can be incorporated into either the main housing beneath the motor or into the base member. The invention contemplates that the panel member can be mounted on the underside of either the base member or the motor housing, or into the body of either one of these. The panel member can be either pivotally mounted or may be arranged to slide on tracks. When not required it can be retracted back to its storage position.

In general terms, the food processor of the present invention has a body housing and a base member extending laterally at the base of the body housing, with a bowl positioned on the base member. Locking formations on the cooperating surfaces of the base member and the bowl act to provide orientation of the bowl on the base member. The hollow lid fits on an upper rim of the bowl, with frictionally interengaging formations for interlocking the lid and the bowl. A drive shaft extending up from the base member through the bowl has lower frictionally interengaging surfaces at a lower part of the shaft and upper frictionally interengaging surfaces at an upper part of the shaft. The upper part of the shaft extends into the hollow lid. A lower cutter is positionable on the drive shaft on the lower interengaging surfaces and a disc cutter is positionable on the upper part of the drive shaft in engagement with the upper interengaging surfaces. The lid has a feed tube and also at one side a delivery chute. Interengaging locking formations are provided on the bowl, the lid and the body member for providing a mechanical locking of bowl and the lid to the body member. When the parts are locked together and when a part of the bowl/lid assembly engages the interlock assembly this will permit supply of power to a drive motor.

One feature of one embodiment of the invention is cooperating or locking formations on the base member and the bowl which are positioned to permit two alternative rotational orientations of the bowl, relative to the base member.

Yet a further feature in another embodiment, there is provided a tab or panel member pivotally mounted in the bottom of the base member, the tab or panel member being retractable into the base member.

In a further feature of the invention, a signal device or indicator light is positioned in a top surface of the body member, for indicating correct locking of the bowl to the base member and the lid to the bowl.

In still a further feature of certain embodiments of the invention, is the provision of a power cord that extends from the base of the body member and is retractable into the base of the body member.

In yet another feature of the invention, the lower interengaging surfaces on the lower part of the drive shaft form a helix such that when the food processor is being used there is a tendency to urge the lower cutter in a downward direction.

Having regard to the above, according to one embodiment of the invention, there is provided a food processor, comprising a drive unit comprising a housing including a base member and a motor housing on the base member, the base member extending laterally of the motor housing for mounting a bowl, a bowl positioned on the base member, orientation indicators on the base member and on the bowl to provide orientation of the bowl on the base member, a closure lid fitting on the bowl, the lid having a feed tube, a drive shaft extending upwardly from the base member through the bowl and into engagement with the closure lid, the drive shaft having lower cooperating engaging surfaces at a lower part thereof and upper cooperating engaging surfaces at an upper part thereof, a lower cutter positioned over the drive shaft, the cutter having a hollow drive shaft and cooperating engaging surfaces on the interior of the hollow drive shaft at a lower end for driving engagement with the lower cooperation engaging surfaces of the drive shaft, a disc cutter for positioning on the upper part of the drive shaft, the disc cutter having cooperating engaging surfaces for engaging the upper cooperating engaging surfaces of the drive shaft, first cooperating engaging formations on the lid and an upper section of the bowl for releasably locking the lid to the bowl, and second cooperating engaging formations on a lower section of the bowl and the base member for releasably engaging the bowl and the base member, and interlock means responsive to the engagement of the bowl and the lid to permit supply of power to a drive motor for the processor.

Desirably in the above embodiment the interlock means is responsive to the locking of the bowl on the base member and the bowl and the lid.

Still further, in an optional preferred embodiment the processor includes orientation indicators on the lid and bowl to provide orientation of the lid on the bowl. The processor may have a bowl which includes a handle, the handle including the orientation indicators to provide orientation of the bowl on the base member and the lid on the bowl.

One embodiment also includes the use of a processor in which the aforementioned engaging formations on the base member and the lower section of the bowl are positioned to permit two alternative rotational orientations of the bowl relative to the base member. In another embodiment, the bowl must be in but one position.

A particularly preferred structure of the food processor of the type described above is where the drive shaft comprises a one-piece shaft, the shaft separately mounting in a spaced-apart manner both the lower cutter and the disc cutter.

Still further, the above processor may be used in combination with a panel member pivotally associated with the base member, the panel member being retractably mounted in association with the base member. The panel member may be employed for presenting indicia such as operating or care and use instructions or the like when displaced from the processor.

In other embodiments, the above type of processor may also include a signal indicator for indicating correct engagement or locking of the bowl and the lid. In one form, the signal indicator may be a light mounted in the processor. The light may have appropriate circuitry connected to the power source and to the interlock feature of the present invention. In place of a light, other suitable indicators such as visual indicators can be employed. In preferred forms, the signal or light indicator is preferably mounted with the controls for the food processor. Generally speaking, these are normally located at the top of the motor housing and typically, the motor controls may include multi-speed switches or an infinitely variable switch to control the speed of the motor. Further, an ON-OFF master switch may be utilized, as well as a "pulse" switch which is adapted to provide short bursts of power for food processing purposes. Ideally, the light indicator is positioned in the line of sight of the user with the controls described herein.

The food processor may also include other conventional elements such as a discharge chute, which functions to permit processed food to be removed from the bowl. The discharge chute can be any suitable opening extending from the lid or bowl and functions in most cases as a continuous feed chute for processed material. In addition, the discharge or continuous feed chute can function in conjunction with a gate, which can be removable to permit access to the chute. Still further, other components such as a displacement disc can be included which can be mounted between the disc cutter and the lower cutter, for expulsion of processed material through the delivery chute. Another embodiment is where the processor could include a retractable power cord.

A particularly preferred embodiment is where the drive shaft has engagement means to engage a hollow interior of the lower cutter and to this end, cooperating helixes, preferably of an off-set nature, can be utilized. One or more spirals may form the helix. It will be appreciated that other cooperating mating or engaging systems can be employed instead of the helix arrangement.

In a still further embodiment of the invention, there is also provided a food processor having a drive unit which is normally mounted in a motor housing or body member, and in which the motor housing is mounted on a base member, which extends laterally from the motor housing, said base member mounting a bowl, a closure lid for the bowl, the lid having a feed tube; a drive shaft extending upwardly from the base member; a cutter positioned on the drive shaft, the lid and the bowl being releasably engageable together, the bowl and the base member being releasably engageable together, and wherein the processor includes an interlock responsive to the engagement of the bowl to the base member and the lid to the bowl to permit supply of power to a drive motor for the processor, in which the invention provides the improvement wherein the processor includes a signal indicator for indicating correct engagement of the lid with the bowl.

In another embodiment, there is also provided a food processor having a drive unit which includes a housing having a base member and a motor housing on the base member, the base member mounting a bowl, a closure lid for the bowl, the lid having a feed tube; a drive shaft extending upwardly from the base member; a cutter positioned on the drive shaft, the lid and the bowl being releasably engageable together, the bowl and the base member being releasably engageable, and wherein the processor includes interlock means responsive to the engagement of the bowl and the lid to the base member to permit supply of power to a drive motor for the processor, in which the invention provides the improvement wherein the processor includes a light indicator for indicating correct alignment of the lid with the bowl, and the bowl with the base member.

In the above embodiment, the light indicator may be positioned in different places on the processor. A most convenient place is at the location where the controls for the processor are mounted—i.e. where the processor has a control panel containing the switches for motor speed, etc. In most cases, the processor will have the control panel at or on the top of the motor housing, and desirably the light indicator will be centrally mounted and readily visible in the control panel. Typically, the light indicator will be a small light source, such as a neon bulb, covered by a lens and powered by the power source for the processor in conjunction with the interlock.

In the above described preceding embodiments, the food processor may include a pivotally mounted panel member, the panel member being retractable relative to the base member for storage of the base member.

In a still further aspect of the present invention, there is further provided another form of a food processor having a drive unit having a housing including a base member and a motor housing, the base member extending laterally and mounting a bowl, a closure lid for the bowl, the lid having a feed tube; a drive shaft extending upwardly from the base member; a cutter positioned on the drive shaft, the lid and the bowl being releasably engageable together, and the bowl being releasably engageable with the base member, in which the invention provides the improvement wherein the processor includes a retractable panel, the panel being pivotally mounted for extension and retraction relative to the body.

In a still further embodiment of another form of the invention, there is provided a food processor having a drive unit having a housing including a base member and a motor housing, the base member extending laterally and mounting a bowl, a closure lid for the bowl, the lid having a feed tube, a drive shaft extending upwardly from the base member; a lower cutter and a reversible slicer/shredder disc positioned on the drive shaft, the lid and the bowl being releasably engageable, in which the invention relates to the improvement wherein the processor includes a one piece drive shaft extending upwardly from the base member, the drive shaft having two spaced-apart mounts for mounting and storing the lower cutter and the shredder in the bowl. In addition, for use with lids having a continuous feed chute, the drive shaft has a third mount intermediate the two mounts mentioned above for mounting and storing a continuous feed or displacement disc.

In all of the above embodiments, a conventional motor can be employed with a typical drive system to rotate the drive shaft at high speeds, as again is conventional and well known in the art. The drive system can either be a gear arrangement or a belt system.

Other objects and advantages will become apparent from the following description and the accompanying drawings.

BRIEF DESCRIPTION OF THE DRAWINGS

FIG. 5 is a side view of the drive shaft in FIG. 1 to a larger scale;

FIG. 6 is a longitudinal cross section on the line 6—6 of FIG. 5;

FIG. 13 is a schematic circuit diagram for different embodiments of the invention.

DETAILED DESCRIPTION OF THE PREFERRED EMBODIMENTS

Figure 1:
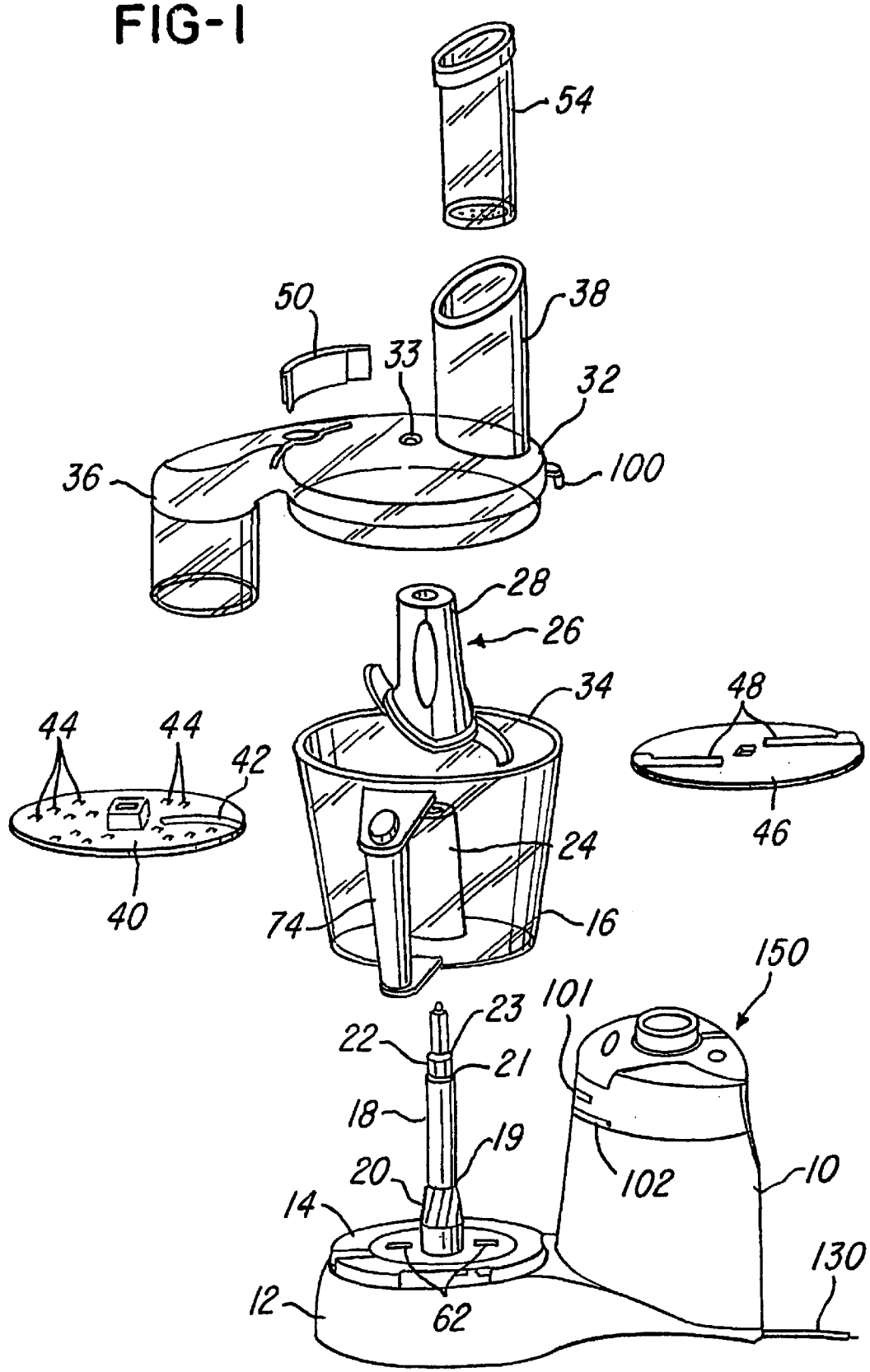
FIG. 1 is a perspective exploded view of a processor, in accordance with the present invention.

FIG. 1 illustrates a food processor of one embodiment of the present invention, in an "exploded" or unassembled condition. It comprises a main body member 10 having a laterally extending base member 12. The base member 12 has an upper surface 14 on which a bowl or mixing vessel 16 can be positioned. Extending upwardly from the base member 12 is a drive shaft 18 having a lower set of engagement surfaces 20 and an upper set of engagement surfaces, generally designated 22. The bowl 16 has a central, upwardly extending, hollow tubular member 24 that fits over the drive shaft 18.

Figure 11:
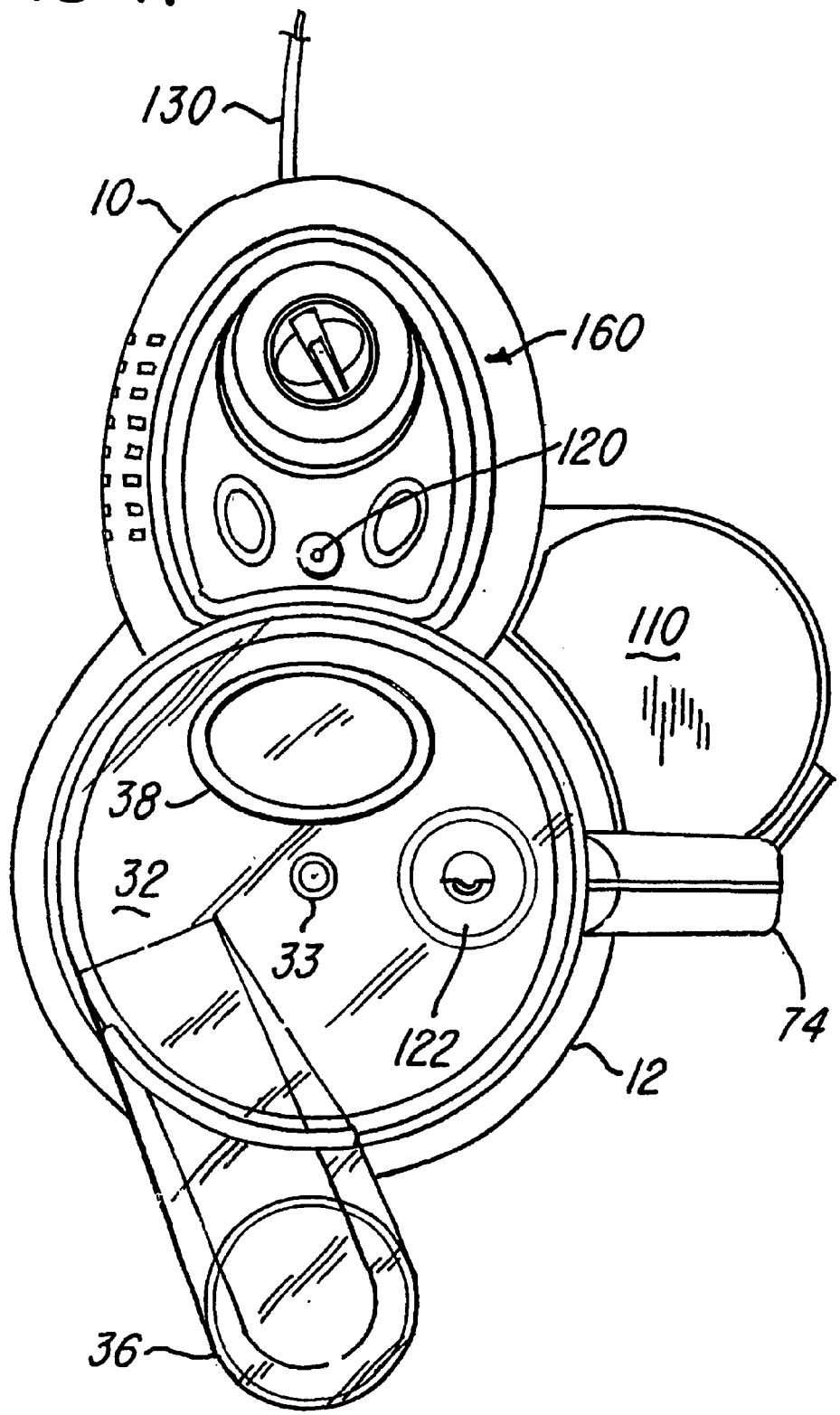
FIG. 11 is a top plan view of the processor of FIG. 10.

As shown in FIGS. 1 and 11 (showing two different embodiments), a novel feature of one version of the present invention is the one piece integral upwardly extending drive shaft 18, having an uppermost portion 25 which, when the bowl or mixing vessel 16 is placed onto the base member over the shaft 18, is adapted to extend into a fixed receiving member or bushing 33 in the lid or closure member 32. The shaft 18 includes three support or mounting surfaces indicated by reference numerals 19, 21 and 23. The shaft 18 can be made of suitable material although in a preferred embodiment, the shaft is preferably formed from nylon.

Figure 9:
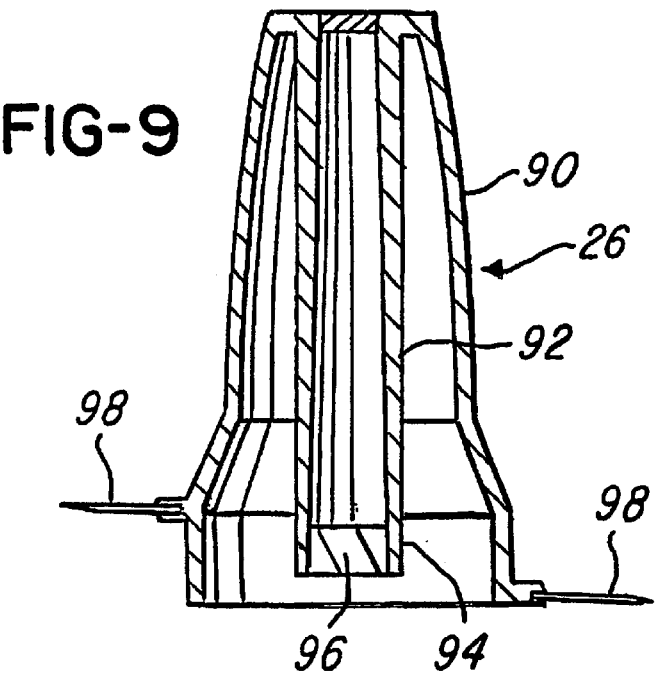
FIG. 9 is a vertical cross section of the bottom cutter in FIG. 1.

In further explanation, as shown in more detail in FIGS. 5 and 6, mounting surface 19 is adapted to receive and support the cutter 26. The cutter 26, as shown in FIG. 9, includes on the interior of the hollow drive shaft 92 a corresponding protrusion which is adapted to at least partially rest upon the mounting surface 19. A mounting surface 21 is adapted to receive and support the displacement or continuous feed disc 46, while the cutter disc 40 is supported by an uppermost mounting surface 23.

The cutter 26, hereinafter referred to as the bottom cutter, has a hollow body 90 which fits over tubular member 24 and an inner tubular shaft 92 which fits over the drive shaft 18. This will be seen more clearly in FIG. 9, described later.

A hollow lid 32 or closure member fits on to the top edge 34 of the bowl 16, the upper end of the drive shaft 18 and the upper set of engagement surfaces 22 being positioned within the lid. A delivery chute 36 is provided on the lid 32, at one side and a feed tube or foodstuff inlet 38 extends upward from the top of the lid 32.

A circular disc cutter 40 is positioned on the upper end of the shaft 18, fitting on the engagement surfaces 22. The disc cutter 40 is of the type which in one installed position has an upward protruding slicing cutting edge 42, while in the reverse position has a plurality of upwardly protruding shredding cutting edges 44. Sliced, or shredded, material can fall into the bowl 16 or, if desired, a displacement disc 46 can be positioned on the upper part of the shaft 18, fitting on the engagement surfaces 22, spaced a small distance below the disc cutter 40. In this arrangement, sliced or shredded material will be displaced outward by ribs 48 on the upper surface of the displacement disc 46, to exit through the chute 36. The displacement or continuous feed disc 46 may include other suitable displacement means such as projections or the like to aid in the displacement of the sliced or shredded material.

If desired, to prevent material being processed in the bowl 16 from being ejected through the chute 36, a removable gate member 50 can be positioned in an arcuate slot 52 in the lid 32.

A pusher 54 can be provided for pushing material down the feed tube 38. The pusher 54 will also act to prevent processed material from being ejected up through the feed tube 38. In use, the foodstuff or material pusher 54 may also include suitable measurement means or markings to ensure the desired amounts of a foodstuff may be used.

Figure 2:
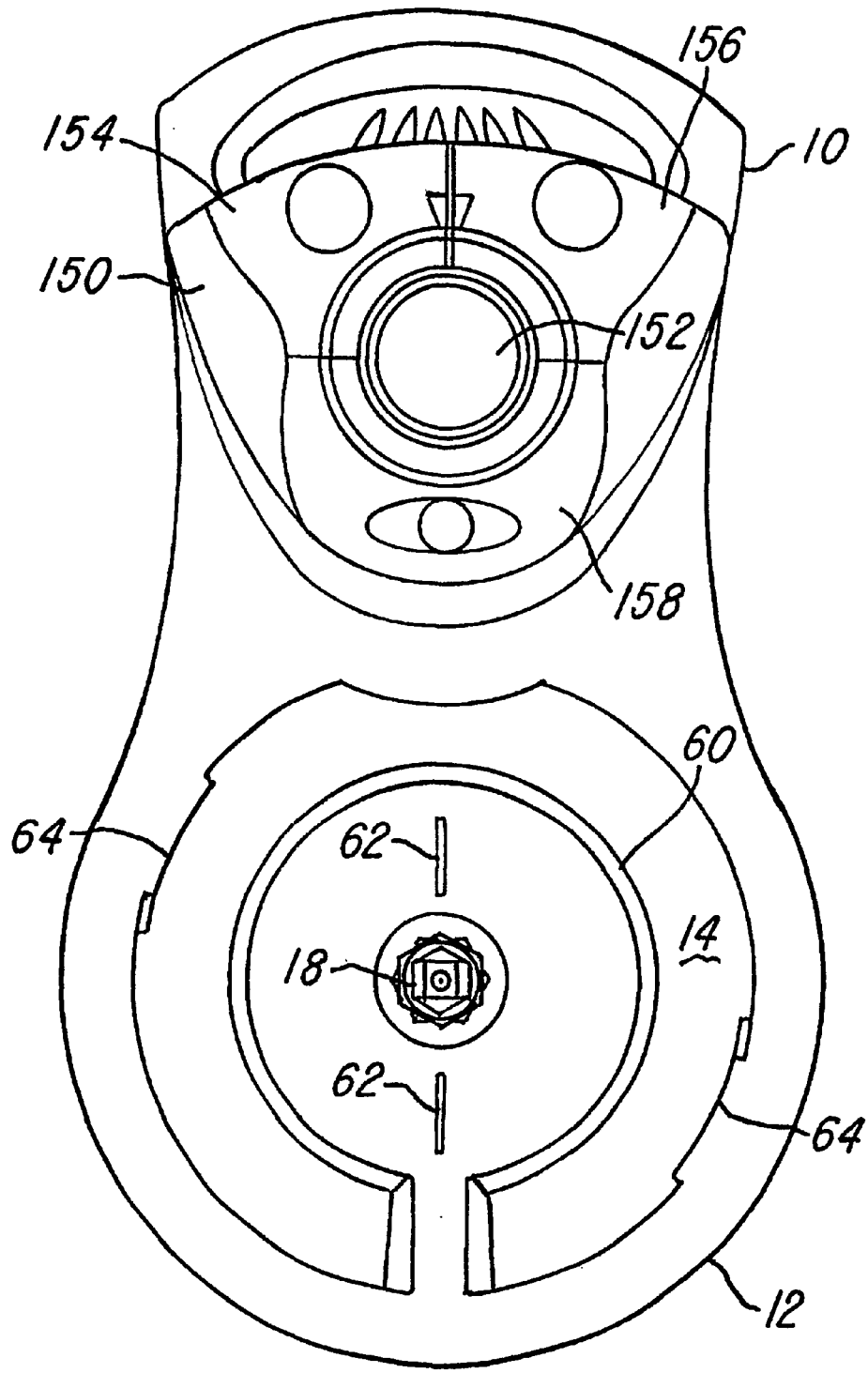
FIG. 2 is a top plan view of the main body of the processor with the extended base for reception of a bowl.

The top surface 14 of the base member 12 is seen more clearly in FIG. 2. There is a circular seating 60 on which the bowl 16 sits and radial ribs 62 can be provided to give some initial alignment facility to the bowl 16. Formations 64 provide locking means for locking with the base of the bowl 16.

Figure 3:
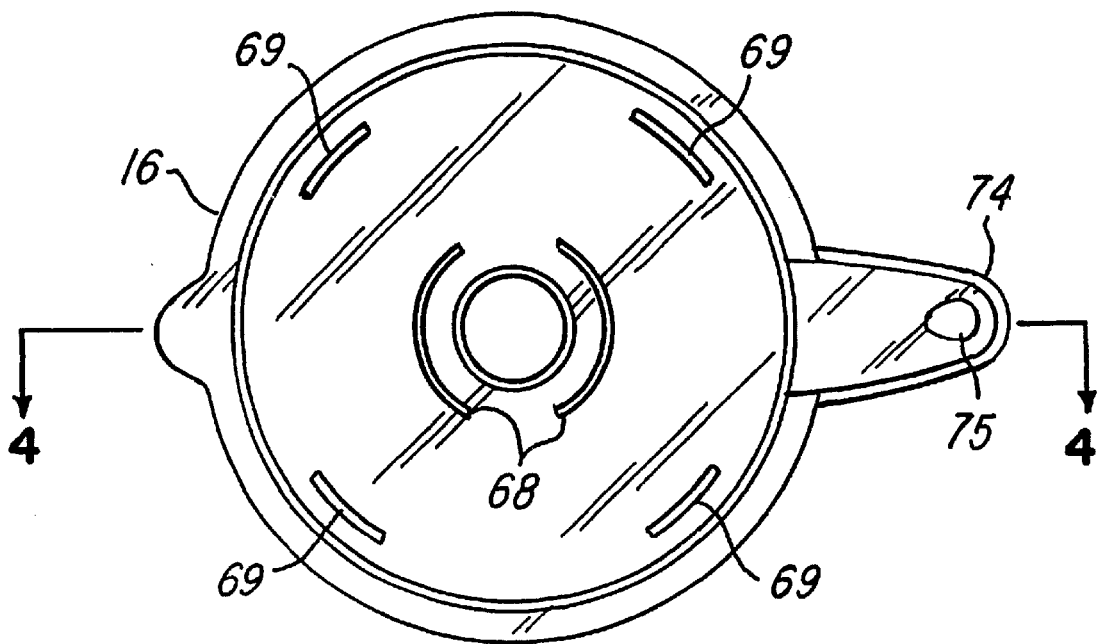
FIG. 3 is a bottom plan view of the underside of a bowl for seating on the base of FIG. 2.
Figure 4:
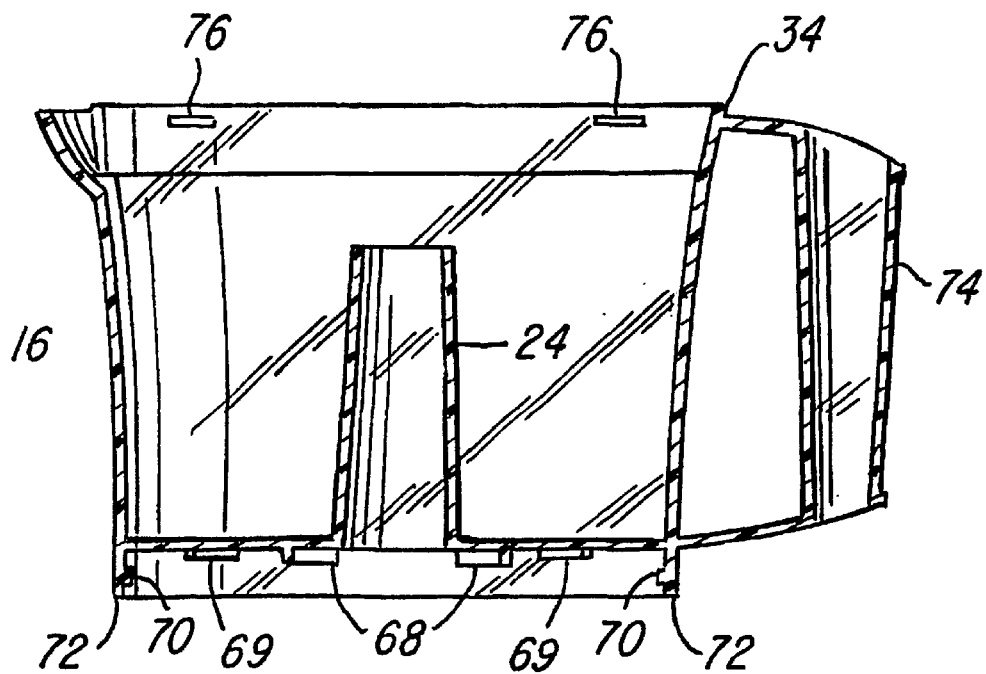
FIG. 4 is a cross section on the line 4—4 of FIG. 3.
Figure 7:
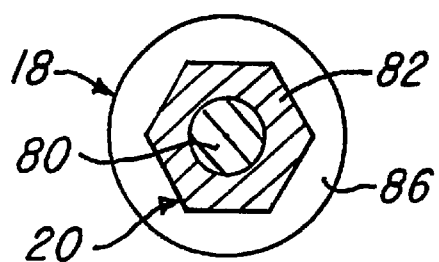
FIGS. 7 and 8 are cross sections on the lines 7—7 and 8—8 respectively, of FIG. 5.
Figure 8:
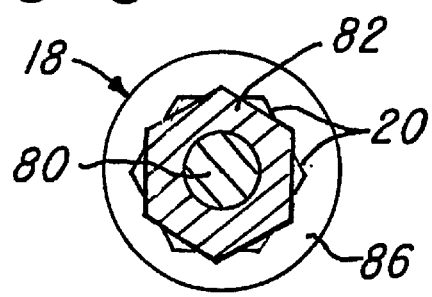

FIGS. 3 and 4 illustrate more clearly the structure of the bowl or mixing vessel 16. In FIG. 3 the outer bottom surface 66 of the bowl 16 includes arcuate ribs 68. These ribs cooperate with the ribs 62 on the base member 12 for aligning the bowl 16 on the base 12. Projections 69, positioned proximate the peripheral edge of the bowl or mixing vessel 16, are adapted to rest upon the upper surface 14 of the base member 12 when the locking formations 70 of the bowl 16 are seated within the cooperating locking formations 64 immediately prior to engaging or locking the bowl 16 to the base member 12.

As seen in FIG. 4, locking formation 70 on the inner surface of the base rim 72 engages with the corresponding formations 64 for locking of the bowl 16 to the base member 12. In FIGS. 3 and 4 and in FIG. 1, a handle 74 is positioned at one side of the bowl 16, and may include a thumb rest or thumb receiving member 75. Also shown in FIG. 4 is the central tubular member 24 of the bowl 16, which is adapted to be placed over the drive shaft 18. Projections 76 on the outer periphery of the bowl 16, are for engaging with matching recesses in the lid 32, in a conventional manner.

FIGS. 5, 6, 7 and 8 illustrate the drive shaft 18 in more detail. Drive shaft 18 is formed by a central solid member 80 and a surrounding sleeve 82. At the lower end of the member 80, a member 84 is formed to receive drive transmission means, such as a belt and pulley system or a gear drive system, from a motor (not shown) in the main housing 10. Parts 80 and 82 are a solid assembly; the sleeve 82 rotates with the central member 80. The drive shaft 18 could be of one piece construction if desired.

At a lower end of the sleeve 82 is a small flange 86, and above this is the lower set of engaging surfaces 20. The flange 86, and surfaces 20, are a short distance above the top surface 14 of the base member 12 and are generally at the level of the bottom of the bowl 16. The tubular member 24 of the bowl 16 fits over the drive shaft 18, including flange 86 and surfaces 20.

The surfaces 20 form a helix. This is seen clearly in FIGS. 7 and 8. The lower cutter 26 is shown in FIG. 9. The cutter 26 has an outer hollow body 90 which fits over the tubular member 24 of the bowl 16. The cutter 26 also has a hollow drive shaft 92 which fits inside the tubular member 24 and over the drive shaft 18. At the lower end 94 of the hollow drive shaft 92 are engagement surfaces 96, in the form of a helix, which engage in a driving manner with the lower engagement surfaces 20 on the drive shaft 18. The direction of the helices 20 and 96 is such that, on rotation, the lower cutter 26 is urged downwards on the drive shaft 18. Cutter blades 98 are attached on the outer surface of the lower cutter 26.

When the lower cutter 26 is positioned on the drive shaft 18, the upper end of the drive shaft 18 extends up through the top of the lower cutter 26, with the upper engagement surfaces 22 being above the top rim 34 of the bowl 16.

The lid 32 is hollow, extending over the bowl 16. The upper end of the drive shaft 18 extends up into the lid 32. The disc cutter 40, and displacement disc 46, fit on the upper engagement surfaces 22, when in use. For normal processing, discs 40 and 46 are not used and material can be fed through feed tube 38 directly into the bowl 16 for cutting etc., by the lower cutter 26. Projections 100 are provided for cooperating with slots or recesses 102 in the main body 10, the projections closing switch contacts when bowl 16 and lid 32 are correctly positioned. Preferably, the lid or closure member 32 includes a recess adapted to receive the upper portion or end of the drive shaft 18.

For slicing, or shredding, the disc cutter 40 is positioned, with one surface for slicing and the other for shredding, depending upon the user's requirements. If the lower cutter 26 is removed, then sliced or shredded material is collected in the bowl 16. If the lower cutter 26 is left in place, then sliced or shredded material will be further processed. Alternatively, the displacement or continuous feed disc is positioned below the disc cutter 40, the gate member 50 removed, and sliced or shredded material will be fed out through the chute 36 for collection.

Figure 10:
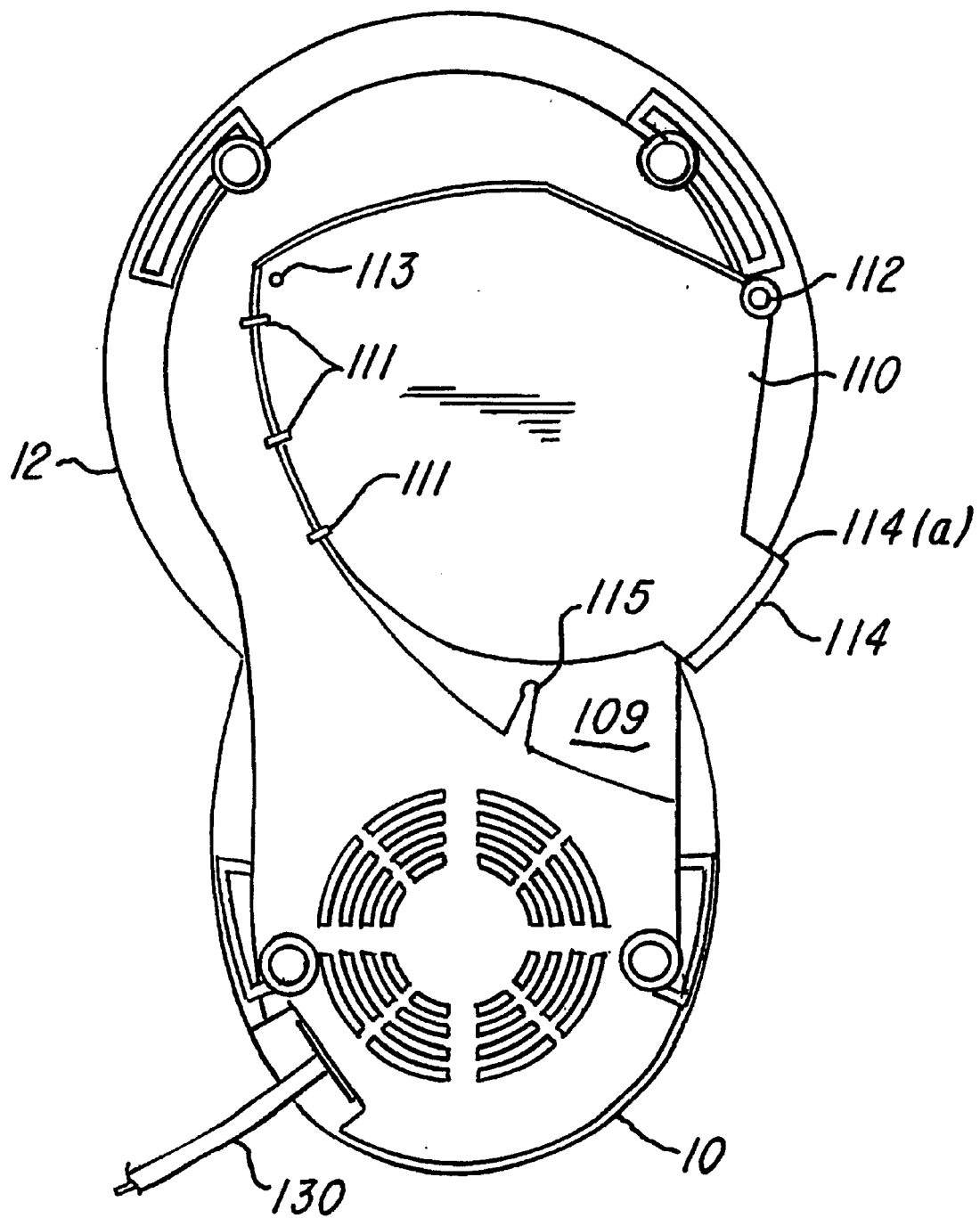
FIG. 10 is a bottom plan view of a modified processor according to another embodiment of the invention.
Figure 12:
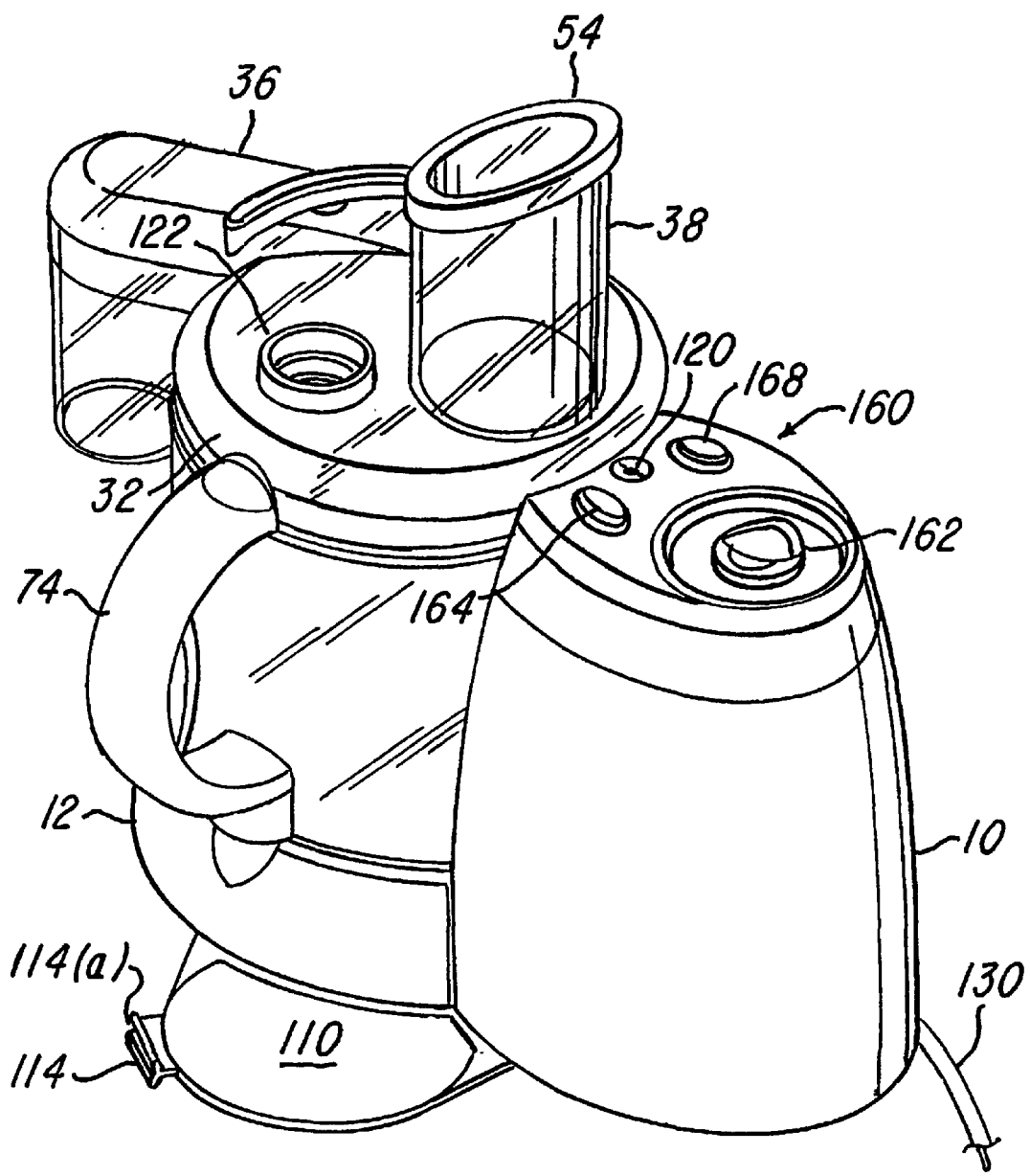
FIG. 12 is a perspective of the processor of FIG. 10.

FIGS. 10, 11 and 12 illustrate various other features of the invention. In FIG. 10, a view on the external bottom of the processor according to one embodiment, there is shown a retractable information tab or panel member 110. The tab 110 is pivotally mounted by a pin 112 and can be manually pulled out by using a small extension 114 (FIGS. 11 and 12) projecting beyond the edge of the base 12. The tab or panel member 110 can carry directions for use of the processor, or other information as desired. The panel member 110 may be positioned on the unit by mounting it in a recess 109 located beneath the base 12 of the processor. Panel member 110 pivots about a predetermined path or trajectory, which is guided and maintained in its storage place by projections or guide members 111 on the bottom of the unit. Panel member 110 can be pivoted to its maximum open distance which is determined by a stop pin 113 abutting against a limit tab or projection 115. To return the tab or panel member to a storage position, panel 110 is rotated under the base 12 until the tab or panel 110 abuts against a rear portion of the recess 109. The outer edge 114(a) of the panel extension 114 extends upwardly to provide a finger grip for pulling on the panel 110 and downwardly to engage the counter or other support surface on which the food processor is placed to restrict downward flexing of the panel 110.

In FIGS. 11 and 12, two further features are illustrated. As will be appreciated, with the requirement that the bowl 16 and lid 32 be correctly oriented relative to each other and to the main body of the processor, and with the requirement that frictionally interengaging formations on the body and lid and on the main body 10 be correctly engaged, it can be difficult to ensure that correct assembly has occurred, except by actuating a switch to energize the motor. If the motor does not operate it must be assumed that correct engagement has not occurred. In the present invention a signal indicator, or indicator light 120 is provided in the top surface of the main body member 10. The indicator light 120 may have appropriate circuitry connected to the power source and to the interlock feature of the present invention. In place of a light, other suitable indicators such as other visual or audible indicators can be employed if desired.

Referring now to FIG. 13, a typical schematic circuit is shown for a multi-speed food processor, in which a motor M is connected to a plurality of switches 131, 132, 134 and 136, representing low speed to high speed motor positions. An interlock designated "I" and included on one line of the power lines driving the motor M, thus providing a function of preventing the motor from operating unless the interlock is correctly activated as otherwise explained herein. The signal indicator, in this case in the form of a light 120, is connected to the interlock whereby the light 120 will illuminate once the interlock has been correctly established by the correct engagement of the processor lid 32 and bowl 16.

Obviously, to actuate the processor, a source of power such as a standard household electrical system, will be employed to power the motor. In use, once the body 12 and lid 32 are correctly oriented and locked in place, and the bowl 16 mounted in correct relationship with the body 10, the interlock projection 100 on lid 32 will be inserted into the corresponding receiving aperture 101. If the signal indicator or light 120 does not appear then there is non-engagement between the body 10 and the bowl 12 and/or lid 32 or the base 12.

Another feature is the provision of an additonal feed inlet in the lid 32. This is shown at 122 in the top surface of the lid 32, in FIGS. 11 and 12. Aperture or opening 122 allows a liquid to be slowly added to the mixture in the bowl 16. It has a small reservoir into which liquid, such as olive oil, or flavouring material, or other, can be poured, and then drip into the bowl 16. Thus one can measure a desired amount of an ingredient, such as a liquid, (for example, a tablespoon), and place it into the reservoir where it will be slowly added while processing in the bowl 16 continuously. Alternatively, the ingredient to be added can be directly poured into the bowl.

A further feature of the invention is provision for the use by left-handed operators. Conventional processors are suitable for use by right-handed users, the handle 74 being towards the right when the bowl 16 is in position. This is normally the only orientation available with the normal positioning of frictionally interengaging formation.

In one form of the present invention, shown in FIG. 1, the alignment means between the bowl 16 and the base 12 are positioned such that two orientations of the bowl are possible, one with the handle to the right and one with the handle to the left.

In such an arrangement, the lid 32 can still have the normal orientation or may be revolved with the bowl 16. If the lid 32 does not change, then duplicate locking formations are required for bowl 16 and lid 32. If the lid 32 moves with the bowl 16, then the locking formations still work. However, it will be necessary to provide alternative locking formations in the body of the processor so that the alternative positioning of the bowl 16 and also of the lid 32 will engage with the alternative formations to provide for electrical power to the motor.

It can also be arranged that the power cord 30 can be retractable into the base of the main body member 10.

For storage, the lower cutter 26 is positioned on the drive shaft 18 within the bowl 16. The two discs 40 and 46 are positioned on the upper part of the drive shaft 18, and the lid 32 positioned on the bowl 16. The unit is locked into position and storage is then easy with no parts separately stored.

Suitable power control means, generally illustrated as reference numeral 150 in FIGS. 1, 2, and as reference numeral 160 in FIGS. 11 and 12, are provided and as illustrated in the Figures, may be positioned on or in the base member.

As shown in FIGS. 1 and 2, control means 150 controls the power and speed of the unit; in this embodiment, the control means 150 is positioned on the upper portion of the base member 12, and includes a speed control switch 152 in addition to master power on and off switches 154 and 156. A pulse control switch 158, may also be included to provide the unit with pulse power, based on the setting of the speed control 152. For example, when the speed control switch 152 is set to a desired setting, i.e., a first power level, the pulse control can be operated at that selected speed. As understood, different speeds and speed settings may be used and as such when the pulse control means are actuated, the speed of the pulse would be that of the selected speed.

As shown in FIGS. 11 and 12, according to one form of the present invention, the power control means generally illustrated as reference numeral 160, is positioned on the upper portion of the base member 12. As shown, the control means 160 includes a variable speed 162 switch or selector, in addition to a master power on-off switch 164. A pulse control switch 168 may also be included to provide the unit with pulse power. As described above, the speed setting for the pulse power switch 168 may be based on the setting of the speed control 162.

What is claimed is:

1. A food processor, comprising:

a drive unit comprising a housing including a base member and a motor housing;

said base member extending laterally of said motor housing for mounting a bowl;

a bowl positioned on said base member;

orientation indicators on said base member and on said bowl to indicate how to orient said bowl on said base member;

a closure lid fitting on said bowl, said lid having a feed tube;

a drive shaft extending upwardly from said base member through said bowl and into engagement with said closure lid, said drive shaft having lower cooperating engaging surfaces at a lower part thereof and upper cooperating engaging surfaces at an upper part thereof;

a lower cutter positioned over said drive shaft, said cutter having a hollow drive shaft and cooperating engaging surfaces on the interior of said hollow drive shaft at a lower end for driving engagement with said lower cooperating engaging surfaces of said drive shaft;

a disc cutter for positioning on said upper part of said drive shaft, said disc cutter having cooperating engaging surfaces for engaging said upper cooperating engaging surfaces of said drive shaft;

first cooperating frictionally engaging formations on said lid and an upper section of said bowl for releasably locking said lid to said bowl, and second cooperating frictionally engaging formations on a lower section of said bowl and said base member for releasably locking said bowl to said base member, and an interlock means responsive to the engagement of said bowl and said lid to permit supply of power to a drive motor for said processor.

2. A food processor as claimed in claim 1, wherein said interlock is responsive to the locking of said bowl on said base member and said bowl and said lid.

3. A food processor as claimed in claim 1, wherein said processor further includes orientation indicators on said lid and said bowl to indicate how to orient said lid on said bowl.

4. A food processor as claimed in claim 1, wherein said bowl includes a handle, said handle including said orientation indicators to indicate how to orient said bowl on said base member and said lid on said bowl.

5. A food processor as claimed in claim 1, wherein said frictionally engaging formations on said base member and the lower section of said bowl are positioned to permit two alternative rotational orientations of said bowl relative to said base member.

6. A food processor as claimed in claim 1, wherein said drive shaft comprises a one-piece shaft, said shaft separately mounting in a spaced-apart manner each of said lower cutter, and said disc cutter.

7. A food processor as claimed in claim 1, including a panel member pivotally associated with said base member, said panel member being retractably mounted in association with said base member.

8. A food processor as claimed in claim 1, including a signal indicator for indicating correct engagement of said bowl and said lid.

9. A food processor as claimed in claim 8, wherein said signal indicator comprises a light and said signal indicator is actuated, when electric power is supplied to said processor, upon correct engagement of both of said bowl and said lid, and said bowl and said base member.

10. A food processor as claimed in claim 8, said lid including a discharge chute and further including a gate member, said gate member being removable to open access to said delivery chute.

11. A food processor as claimed in claim 10, further including a displacement disc mountable between said disc cutter and said lower cutter, for expulsion of processed material through said delivery chute.

12. A food processor as claimed in claim 1, including a power cord, said cord being extractable from and retractable into the base of said body member.

13. A food processor as claimed in claim 1, said lower engaging surfaces of said drive shaft and said engaging surfaces on the interior of said hollow drive shaft forming a helix, said helix being arranged to urge said lower cutter in a downward direction during operation of the processor.

14. In a food processor having a drive unit comprising a housing including a base member and a motor housing, said base member extending laterally and mounting a bowl, a closure lid for said bowl, said lid having a feed tube; a drive shaft extending upwardly from said base member; a cutter positioned on said drive shaft, said lid and said bowl being releasably engageable together, said bowl and said base member being releasably engageable together, and wherein said processor includes an interlock responsive to the engagement of said bowl and said lid to said base member to permit supply of power to a drive motor for said processor, the improvement wherein said processor includes a signal indicator for indicating correct engagement of said lid with said bowl.

15. A food processor as claimed in claim 14, wherein said bowl and said lid include first orientation indicators to indicate how said lid should be oriented on said bowl, and said bowl and said base member include second orientation indicators to indicate how said bowl should be oriented on said base.

16. In a food processor having a drive unit comprising a housing including a base member and a motor housing, said base member extending laterally and mounting a bowl, a closure lid for said bowl, said lid having a feed tube; a drive shaft extending upwardly from said base member; a cutter positioned on said drive shaft, said lid and said bowl being releasably engageable together, said bowl and said base member being releasably engageable together, and wherein said processor includes an interlock responsive to the engagement of said bowl and said lid to said base and said lid to said bowl member to permit supply of power to a drive motor for said processor, the improvement wherein said processor includes a light indicator for indicating correct alignment of said lid with said bowl, and said bowl with said base member.

17. A food processor as claimed in claim 16, includes a pivotally mounted panel member, said panel member being retractable relative to said base member for storage.

18. A food processor as claimed in claim 16, wherein said light indicator is operative in association with said interlock.

19. A food processor as claimed in claim 16, wherein said light indicator is actuatable upon correct locking engagement of both of said bowl and said lid, and said bowl and said base member, said light indicator being connected to said interlock.

20. A food processor as claimed in claim 16, wherein said drive shaft comprises a one-piece drive shaft, said drive shaft having two spaced-apart mounts for separately mounting and storing in said bowl a lower cutter and a disc cutter.

21. A food processor as claimed in claim 20, further including a displacement disc, said shaft having a third mount for mounting and storing said displacement disc in said bowl between said mounts for said lower cutter and said disc cutter.

22. A food processor as claimed in claim 16, including a power cord extending from the base of said body member, said cord being extractable from and retractable into said base of said body member.

23. A food processor as claimed in claim 20, said processor including a lower cutter and a disc cutter, and wherein said drive shaft has a lower cooperating helix at a lower part thereof, said lower cutter being mounted on said drive shaft and having a hollow shaft provided with a corresponding lower cooperating helix engageable with said helix of said drive shaft, said helixes being arranged to urge said lower cutter in a downward direction during operation of the processor.

24. In a food processor having a drive unit comprising a housing including a base member and a motor housing, a bowl mountable on said base member, a closure lid for said bowl, said lid having a feed tube; a drive shaft extending upwardly from said base member; a cutter positioned on said drive shaft, said lid and said bowl being releasably engageable together, and said bowl being releasably engageable with said base member, the improvement wherein said processor includes a retractable panel mounted on said base member, said panel being pivotally mounted for extension and retraction relative to said base member.

25. A food processor as claimed in claim 24, wherein said panel is mounted beneath said base member and is pivotable from beneath said base member from a storage position to a use position adjacent said base member.

26. A food processor as claimed in claim 24, wherein said panel member includes indicia thereon.

27. A food processor as claimed in claim 26, wherein said indicia comprise operating instructions.

28. A food processor as claimed in claim 24, wherein said panel includes a stop to limit the pivotable movement of said panel when in an extended position.

29. A food processor as claimed in claim 24, wherein said processor includes a signal indicator actuatable upon correct engagement of both of said bowl and said lid, and said bowl and said base member.

30. A food processor as claimed in claim 24, wherein said processor includes a lower cutter and a disc cutter, and wherein said drive shaft comprises a one-piece drive shaft, said drive shaft having two spaced-apart mounts for separately mounting and storing in said bowl said lower cutter and said disc cutter.

31. A food processor as claimed in claim 30, further including a displacement disc, said shaft having a third mount for mounting and storing said displacement disc in said bowl between said mounts for said lower cutter and said disc cutter.

32. A food processor as claimed in claim 24, including a power cord extending from the base member, said cord being extractable from and retractable into said base member.

33. A food processor as claimed in claim 24, wherein said drive shaft has a lower cooperating helix at a lower part thereof, said cutter being mounted on said drive shaft and having a hollow drive shaft provided with a corresponding lower cooperating helix engageable with said helix of said drive shaft, said helixes being arranged to urge said cutter in a downward direction during operation of the processor.

34. In a food processor having a drive unit comprising a housing including a base member and a motor housing, a bowl mountable on said base member, a closure lid for said bowl, said lid having a feed tube, a drive shaft extending upwardly from said base member; a lower cutter and a food processing disc positioned on said drive shaft, said lid and said bowl being releasably engageable together, the improvement wherein said processor includes a one piece drive shaft extending upwardly from said base member, said drive shaft having two spaced-apart mounts for mounting and storing said lower cutter and said food processing disc in said bowl.

35. A food processor as defined in claim 34, said processor including a displacement disc, said drive shaft including a third mount for mounting and storing said displacement disc between said lower cutter and said food processing disc.

36. A food processor as defined in claim 35, wherein said lid includes a bushing, and wherein said drive shaft includes an upper end rotatably received within said bushing of said lid.

37. A food processor as defined in claim 35, wherein said mounts for said lower cutter and said food processing disc comprise spaced-apart stepped shoulders on said drive shaft.

38. A food processor as defined in claim 34, wherein said processor includes a signal indicator for indicating correct alignment of said bowl with said closure lid.

39. A food processor as defined in claim 34, including an interlock responsive to the engagement of said bowl and said lid to permit supply of power to a drive motor for said processor.

40. A food processor as defined in claim 34, wherein said processor includes a retractable panel mounted for extension and retraction relative to said body member.

41. A food processor as defined in claim 36, wherein said upper end of said shaft includes a metal bearing rotatable within said bushing of said lid.

42. A food processor as claimed in claim 16, wherein said motor housing includes control means for said motor on the top of said housing, said indicator light being mounted in said motor housing at said top together with said control means.

* * * * *